(12) United States Patent
Wurth et al.

(10) Patent No.: US 9,906,546 B2
(45) Date of Patent: Feb. 27, 2018

(54) WEB SERVICE TESTING

(71) Applicant: INTERNATIONAL BUSINESS MACHINES CORPORATION, Armonk, NY (US)

(72) Inventors: Emmanuel Wurth, Toulouse (FR); Jean-Philippe Delpiroux, Toulouse (FR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/895,070

(22) PCT Filed: May 16, 2014

(86) PCT No.: PCT/EP2014/060137
§ 371 (c)(1),
(2) Date: Dec. 1, 2015

(87) PCT Pub. No.: WO2014/195115
PCT Pub. Date: Dec. 11, 2014

(65) Prior Publication Data
US 2016/0127409 A1  May 5, 2016

(30) Foreign Application Priority Data

Jun. 4, 2013  (GB) .................. 1309938.7

(51) Int. Cl.
H04L 29/06 (2006.01)
G06F 21/57 (2013.01)
H04L 29/08 (2006.01)

(52) U.S. Cl.
CPC ........ H04L 63/1433 (2013.01); G06F 21/577 (2013.01); H04L 63/168 (2013.01); H04L 67/02 (2013.01); H04L 67/06 (2013.01)

(58) Field of Classification Search
CPC ... G06F 21/577; H04L 63/1433; H04L 67/06; H04L 67/02; H04L 63/168
See application file for complete search history.

(56) References Cited

U.S. PATENT DOCUMENTS 7,711,832 B1 * 5/2010 Champion ........ G06F 17/30899
                                              709/202
2005/0044197 A1 * 2/2005 Lai .................... G06Q 10/10
                                              709/223

(Continued)

FOREIGN PATENT DOCUMENTS

EP  2175373 A1  4/2010

OTHER PUBLICATIONS

International Search Report for PCT/EP2014/060137 dated Aug. 14, 2014.

(Continued)

Primary Examiner — Mohammad A Siddiqi
(74) Attorney, Agent, or Firm — Richard Wilhelm, Esq.; Kevin P. Radigan, Esq.; Heslin Rothenberg Farley & Mesiti P.C.

(57) ABSTRACT

Disclosed is a computer-implemented method and system of inferring a web service infrastructure from a web service hosted on a web server. The method includes: downloading a web service description language (WSDL) file describing the web service from a location on the web server identified by a uniform resource locator (URL); identifying at least one of a web service design technology and a web service design technology provider from character strings indicative of the technology and implementation, respectively, in at least one of the URL and WSDL file; and inferring the web service infrastructure from the identified web service design technology and web service design technology provider. A (Continued)

computer program product having aspects of the method as program code is also disclosed.

3 Claims, 5 Drawing Sheets

(56) References Cited

U.S. PATENT DOCUMENTS

| | | | |
|---|---|---|---|
| 2005/0160153 A1* | 7/2005 | Knutson | G06F 17/3089 709/217 |
| 2006/0031850 A1* | 2/2006 | Falter | G06F 9/465 719/320 |
| 2006/0236313 A1* | 10/2006 | Bibr | G06F 9/44526 717/168 |
| 2006/0277606 A1 | 12/2006 | Yunus et al. | |
| 2007/0169199 A1* | 7/2007 | Quinnell | G06F 21/577 726/25 |
| 2007/0234415 A1 | 10/2007 | Zaninotti et al. | |
| 2008/0040510 A1* | 2/2008 | Warner | G06F 17/3089 709/246 |
| 2008/0228796 A1* | 9/2008 | Angelov | G06F 17/2247 |
| 2009/0132692 A1* | 5/2009 | Ansari | G06F 21/121 709/223 |
| 2009/0132856 A1 | 5/2009 | Gorman et al. | |

OTHER PUBLICATIONS

OWASP Testing Guide 2008 V3.0, Jan. 1, 2008.
Martin et al., "Automated Robustness Testing of Web Services", Proceedings of the 4th International Workshop on SOA and Web Services Best Practices (SOAWS), dated 2006 (5 pages).

\* cited by examiner

WEB SERVICE TESTING

BACKGROUND

The present invention inter alia relates to a method and system for testing the robustness of a web service against malicious attacks.

Over the last decade, the Internet has become a service-oriented platform. Nowadays, many web-based services are provided via one or more application programming interfaces (APIs) that are accessible via hypertext transfer protocol (HTTP) for execution on one or more computers. Such a service may be accessible via a layer of one or more service oriented architecture (SOA) interceptors, e.g. to validate the credentials of the client. Information between the web service and a client is typically exchanged using suitable protocols, such as the simple object access protocol (SOAP) or representational state transfers (REST) between the server and client.

As such web services require access to confidential or sensitive information, e.g. stored in a database, such services can become the target of malicious attacks in an attempt to obtain access to this information. It is therefore of paramount importance that the web service is designed in a manner that can withstand such attacks. In other words, it is important that the web service is robust and secure.

To this end, solutions are available to test the security of a web service. Such solutions typically simulate an attack on the web service and the level of success of the attack provides valuable insights into the vulnerabilities of the tested web services, which insights can be used to improve the robustness of the web service.

However, it is not straightforward to design a suitable test strategy for such tests. If the test strategy is not properly aligned with the web service infrastructure, the simulated attacks may not sufficiently penetrate the web service and may not expose its vulnerabilities. This can lead to insecure web services being released, which can have serious consequences as will be readily understood.

US 2012/0059919 A1 discloses a method of testing web services using SOAP or REST protocols with a web service testing framework. The protocol used by the web service can be determined from packet header information. However, the choice of protocol provides limited information about the web service structure, and gives little guidance as to how to structure the web service test routines in order to optimize the coverage and/or accuracy of the test. There exists a need to further improve the methodology of web service test design.

SUMMARY

In one or more aspects, a computer-implemented method is provided for inferring a web service infrastructure from a web service hosted on a web server. The method includes: downloading a web service description language (WSDL) file describing the web service from a location on the web server identified by a uniform resource locator (URL); identifying at least one of a web service design technology and a web service technology provider from character strings indicative of the web service design technology and web service technology provider, respectively, in at least one of the WSDL file and URL; and inferring the web service infrastructure from the identified web service design technology and the identified web service technology provider.

In one or more other aspects, a system for inferring a web service infrastructure from a web service hosted on a web server is provided. The system includes a memory, and a processor communicatively coupled to the memory, wherein the system performs a method comprising: downloading a web service description language (WSDL) file describing the web service from a location on the web server identified by a uniform resource locator (URL); identifying at least one of a web service design technology and a web service technology provider from character strings indicative of the web service design technology and web service technology provider, respectively, in at least one of the WSDL file and URL; and inferring the web service infrastructure from the identified web service design technology and the identified web service technology provider.

In one or more further aspects, a computer program product for inferring a web service infrastructure from a web service hosted on a web server is provided. The computer program product includes a computer readable storage medium having program instructions embodied therewith, the program instructions being executable by a processor to cause the processor to perform a method comprising: downloading a web service description language (WSDL) file describing the web service from a location on the web server identified by a uniform resource locator (URL); identifying at least one of a web service design technology and a web service technology provider from character strings indicative of the web service design technology and web service technology provider, respectively, in at least one of the WSDL file and URL; and inferring the web service infrastructure from the identified web service design technology and the identified web service technology provider.

BRIEF DESCRIPTION OF THE DRAWINGS

Embodiments of the present invention are described below, by way of example only, with reference to the drawings, in which.

DETAILED DESCRIPTION

Figure 1:
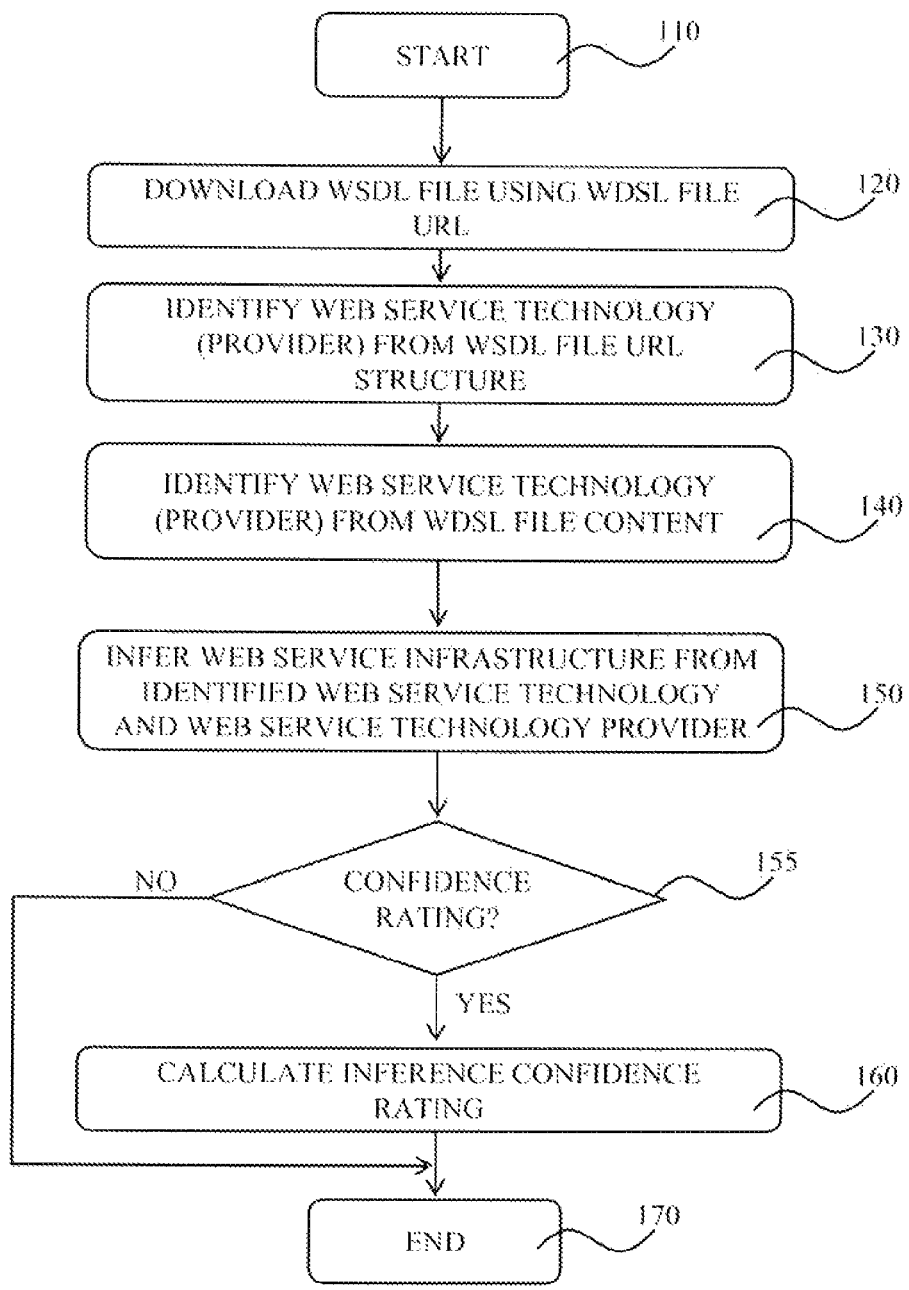
FIG. 1 depicts a flow chart of one embodiment of a method, in accordance with one or more aspects of the present invention.

The present invention seeks to provide a method and system that can provide insights into the infrastructure of the web service to be tested.

The present invention further seeks to provide a method and system of developing a web service test based on these insights and testing the web service accordingly.

According to an aspect of the present invention, there is provided a computer-implemented method of inferring a web service infrastructure from a web service hosted on a web server, the method comprising downloading a web service description language (WSDL) file describing the web service from a location on the web server identified by a uniform resource locator (URL); identifying at least one of a web service design technology and a web service technology provider from character strings indicative of the technology and technology provider respectively in at least one of the URL and WSDL file; and inferring the web service infrastructure from the identified web service design technology and identified web service technology provider.

Various aspects of the present invention are based on the realization that the design technology and web service technology provider providing the tools to design the web service in this technology typically leave a fingerprint in the web service design language (WSDL) file and the uniform resource locator (URL) of the web service. More specifically, aspects are based on the insight that the design technology and its chosen provider create idiom in the form of recognizable character strings in the WSDL file and the URL, which character strings can be detected to provide information about the design technology and the provider enabling the technology, e.g. in the form of design tools for designing the web service, which therefore provides a valuable insight into the web service infrastructure, as such infrastructure at least partially is the consequence of the design technology in which the web service is realized.

In an one or more aspects, the identifying a web service design technology provider may comprise identifying a character string indicative of the provider in the WSDL file, and wherein of identifying the web service technology may comprise identifying a character string indicative of the technology in the URL and/or WSDL file.

The identifying the web service design technology may comprise comparing the URL character string against a library of technology-specific character strings and matching the URL character string to one of the technology-specific character strings in the library.

The identifying the web service design technology provider may comprise comparing the at least one WSDL file character string against a library of provider-specific character strings and matching the extracted WSDL file character string to one of the provider-specific character strings in the library.

In an advantageous embodiment, the method may further comprise generating web service hosting information by analyzing the hypertext transfer protocol (HTTP) headers generated during the communication with the web server to identify at least one character string indicative of the web server model and/or web service framework from the headers, wherein the inferring the web service infrastructure comprises inferring the web service infrastructure from the identified web service design technology, the identified web service design technology provider and the web service hosting information. This further expands the insights into the web service infrastructure as information about the particular web server used to host the web service and the web service framework, i.e. the web service stack, can be included in the inference of the web service infrastructure. Consequently, because a more extensive set of web service infrastructure information is obtained, a better targeted web service security test can be designed.

The extracting the at least one web server model and/or web service framework character string from the headers may comprise comparing the header character string against a library of server model-specific and/or technology-specific character strings and matching the extracted header character string to one of the server model-specific and/or framework-specific character strings in the library.

In an embodiment, the generating web service hosting information further may comprise modifying the URL; accessing the web server using the modified URL; collecting a web server response; and extracting a web server model and/or web service framework character string from the response, wherein the inferring the web service infrastructure comprises inferring the web service infrastructure from the identified web service design technology, the identified web service design technology provider and the web service hosting information. The intentional probing of the web service space using modified URLs will trigger a response from the web service, which response will contain information about the web server hosting the web service and/or the web service framework, which information can be used to further strengthen the inference of the web service infrastructure.

The step of modifying the URL may for instance comprise truncating the URL or changing at least one character of the URL.

In an embodiment, the method further comprises assigning a confidence score to the inferred web service infrastructure. This score can be used as a reliability indicator of the inference result, which may be taken into consideration when designing a security test for the web service.

In an embodiment, the assigning the confidence score comprises evaluating individual pieces of web service infrastructure information; accepting or rejecting each individual piece of web service infrastructure information; and calculating the confidence score from the accepted pieces of web service infrastructure information. For instance, the score may be based on the total number of accepted pieces of web service infrastructure information, i.e. the total number of pieces of web service infrastructure information considered reliable, with the confidence score being correlated to the number of accepted pieces of web service infrastructure information.

The evaluating the individual pieces of web service infrastructure information may comprise identifying incompatible pieces of web service infrastructure information, wherein the accepting or rejecting each individual piece of web service infrastructure information may comprise rejecting the incompatible pieces of web service infrastructure information. In this aspect, a rule engine may be applied to the individual pieces of web service infrastructure information in order to detect conflicts between pieces of information, e.g. impossible combinations of inferred web service technology and inferred web server, in which the conflicting information is removed from the information set prior to calculating the confidence score.

According to another aspect of the present invention, a method of testing a web service is provided, the method comprising receiving an inferred web service infrastructure obtained by an aspect of the web service infrastructure inference method of the present invention; designing a security test based on the inferred web service infrastructure; and testing the web service using the designed security test. Because the security test is designed using insights into the infrastructure of the web service to be tested, a test can be developed that specifically targets the underlying infrastructure of the web service, thus providing more reliable test results.

Aspects of the methods of the present invention may be embodied in the form of computer program code on a computer program product comprising a computer-readable storage medium, wherein the computer program code when executed on one or more processors of a computer system implements these aspects.

The computer-readable storage medium may be selected from a CD, DVD, flash memory card, a USB memory stick, a random access memory, a read-only memory, a computer hard disk, a storage area network, a network server and an Internet server.

According to yet another aspect of the present invention, a computer system is provided comprising the computer program product according to one or more aspects of the present invention and at least one processor adapted to execute the computer program code. Such a computer system is able to provide improved insights into a web service infrastructure and use these insights to invoke a more robust security test of the web service for the reasons already explained above.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The various aspects of a method in accordance with the present invention may be stored on a computer program product comprising a computer-readable storage medium. The computer-readable storage medium may be any medium that can be accessed by a computer for the retrieval of digital data from the medium. Non-limiting examples of a computer-readable storage medium include a CD, DVD, flash memory card, a USB memory stick, a random access memory, a read-only memory, a computer hard disk, a storage area network, a network server, an Internet server and so on.

In the context of the present application, a (computer) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

In the context of the present application, the term "web service infrastructure" refers to the chosen design technology of the web service, the chosen provider of this design technology and the server architecture hosting the web service. More specifically, the information relating to the design technology provider of the web service may include the design tool used to design the web service as well as the web service framework in which the web service is designed, e.g. the web service stack.

In the context of the present invention, the term "character string" is used to refer to text or language structures such as names, abbreviations and/or acronyms in WDSL files, URLs, headers and other electronic data generated during the design or execution of the web service, which structures provide evidence or are at least indicative of a particular tool or technology responsible for its creation and/or execution.

FIG. 1 depicts a flow chart of one embodiment of a web service infrastructure inference method 100. The method 100 starts in step 110 before proceeding to step 120 in which a web service is accessed by specifying the URL of the web service, after which the WDSL file URL is located and accessed to download the WDSL file. Alternatively, the WDSL file may be accessed and downloaded directly in step 120. It is noted that the URL identifying the web service or the WDSL file may be specified by a user prior to the download step 120, e.g. during startup of the method in step 110.

The method subsequently proceeds to step 130, in which the structure of the URL of the WSDL file is analyzed. Specifically, the URL is checked for the presence of certain character strings that are indicative of the web service technology and/or web service technology provider information associated with the URL. To this end, the URL may be evaluated, by comparing its structure against a library of URL structures associated with different web service design technologies or technology providers and identifying the appropriate web service design technology and/or technology provider by matching the web service URL with one of the library URLs.

In one or more embodiments, the web service technology provider may typically be determined at a high level of abstraction, such as the vendor of the technology, e.g. Microsoft, IBM, Oracle, and so on, as each vendor uses vendor-specific design principles and design tools for the development of web services in their respective technologies. The technology itself may be synonymous with its file format, e.g. asmx, wcf, jax-rpc and so on.

Table 1 gives a list of example URLs and the web service technology and web service technology implementation information that can be extracted therefrom. The identified character string is shown in bold.

TABLE 1

| url | Identified design technology/ provider |
|---|---|
| http://tstsvr.achworks.com/dnet/achws.asm?wsdl | Asmx/.NET |
| http://www.infoaccelerator.net/net/infoaccelerator/pointCalc/PointCalculator.cfc?wsdl | Cfc/ColdFusion |
| http://footballpool.dataaccess.eu/data/info.wso?WSDL | Wso/Visual DataFlex |
| http://www.restfulwebservices.net/wcf/GeoIPService.svc?wsdl | Svc/.NET |

In an embodiment, the library of URL structures associated with different web service technologies (and implied technology providers) may be the valid character string library of a parser that parses the URLs to identify the web service technology responsible for the creation of the URL. It is well known per se to build a parser such that this is not explained in further detail for the sake of brevity only.

In one or more embodiments, step 130 may be performed at run time, e.g. during the download of the WSDL file.

Upon downloading the WSDL file, the WSDL file is analyzed in step 140 for the presence of character strings indicative of the design technology provider or even the design tool used for the creation of the web service and WSDL file. To this end, the WSDL file may be evaluated, by comparing its contents against a library of character strings associated with different web service technology provider indicators and identifying the appropriate web service technology provider or design tool by matching a portion of the WSDL file content with one of the library character strings. Such character strings can for instance be identified in the comments, metatags such as SOAP extensions and namespace of the WSDL file. Table 2 gives some examples of such WSDL file contents and the associated web service design technology provider or tool used for the design of the web service. The identified character string is underlined.

TABLE 2

| WSDL file content snippet | Design Technology Provider (Tool) |
|---|---|
| <wsdl:definitions targetNamespace="http://pack"><br><!--WSDL created by Apache Axis version: 1.2.1<br>Built on Jun 07, 2005 (10:11:43 EDT)--> | Apache (Tool Apache Axis 1.2.1) |
| <!--WSDL created by Apache Axis version: 1.4<br>Built on Apr 22, 2006 (06:55:48 PDT)--> | Apache (Tool Apache Axis 1.4) |
| <wsdl:definitions targetNamespace="http://comp"><!--WSDL created by ColdFusion version 9,0,1,274733--><wsdl:types><br><xsd:import<br>schemaLocation="http://www.restfulwebservices.net/wcf/CurrencyService.svc?xsd=xsd1"<br>namespace="http://schemas.microsoft.com/2003/10/Serialization/"/> | ColdFusion (Tool Cold Fusion 9) Microsoft |
| <soap12:address location="net.msmq://localhost/private/ServiceModelSamplesMessageSecurity"/><br><!-- Generated 12/24/2001 11:42:12 PM by West Wind wwSOAP WSDL Generator 1.50 --><definitions name="wwhelpservice" targetNamespace="http://tempuri.org/wsdl/"> | West Wind SOAP Microsoft (Tool WSDL Generator 1.50) |
| <!-- Published by JAX-WS RI at http://jax-ws.dev.java.net. RI's version is JAX-WS RI 2.1.6 in JDK 6.<br>--><!-- Generated by JAX-WSRI at http://jax-ws.dev.java.net. RI's version is JAX-WS RI 2.1.6 in JDK 6. → | Java (Tool JAVA JAX-WS) |
| <!--generated by Glue Standard 5.0.2 build 77 on Sat Feb 09 08:26:34 EST 2013--> | Glue (Tool Glue Standard 5.0.2) |

In one or more embodiments, the a library of WSDL file character strings, such as a list of recognizable web service design technology provider identifiers or web service design tool identifiers may be the valid character string library of a parser that parses the WSDL file to identify the provider or web service design tool responsible for the creation of the WSDL file and the associated web service.

The collected web service infrastructure information is subsequently processed in step 150 to infer a web service infrastructure from the collected information. For instance, the method may produce an output it which it is concluded that there are (sufficient) indications that the web service has been designed in NET technology using a West Wind SOAP WSDL Generator 1.50. This information may subsequently be used to design and execute a tailored security test for this service, as will be explained in more detail later.

In one embodiment, the method may check in step 155 if the inferred web service infrastructure should be given a confidence score. Such a confidence score for instance may be indicative of the number of pieces of information extracted from the URL in step 130 and from the WSDL file in step 140 and of the number of conflicts in the extracted information. Such a confidence score may, for instance, be used by the test designer to decide if the inferred web service infrastructure should be trusted. Alternatively, the inferred web service infrastructure may only be published by the method when the confidence score has reached a minimum value.

If it is decided that a confidence score should be calculated, the method proceeds to step 160 to calculate the confidence score before terminating in step 170. This calculation will be explained in more detail below with the aid of FIG. 4. If no confidence score is required, then the method 100 will skip step 160 before terminating in step 170.

The embodiment of the inference method 100 shown in FIG. 1 is limited to extracting web service infrastructure information from the web service or WSDL file URL and the WSDL file itself. This typically limits the web service infrastructure information to information about the implementation of the web service itself without revealing information about the underlying server architecture hosting the web service or indeed the web service framework, i.e. the framework of services, service descriptions and service communication protocols, which is sometimes also referred to as the web service stack.

Figure 2:
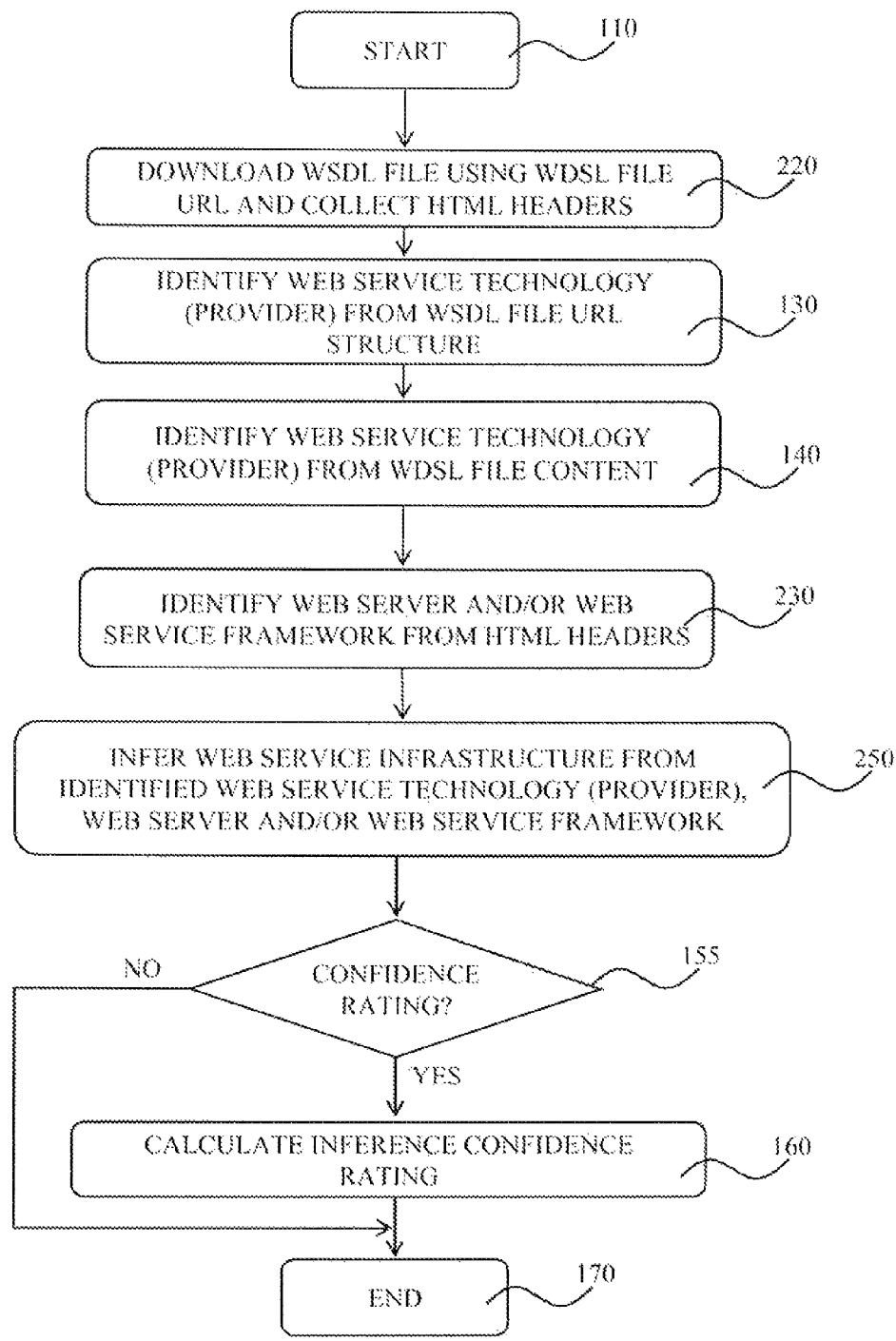
FIG. 2 depicts a flow chart of another embodiment of a method, in accordance with one or more aspects of the present invention.

FIG. 2 depicts a flow chart of another embodiment of a web service infrastructure inference method 200 in which at least some of this additional service infrastructure information is retrieved and included in the inferred web service infrastructure. Steps in the method 200 that are substantially identical to the steps in the method 100 are identified by the same reference numeral.

As before, the method 200 starts in step 110 before proceeding to step 220. Step 220 is identical to step 120 of method 100 with the addition that the HTML headers that are communicated during the downloading of the WSDL file are also collected. Next, the web service or WSDL file URL and the WSDL file itself are evaluated in steps 130 and 140, respectively, as previously explained. The method 200 comprises the additional step 230 in which the collected HTML headers are to identify web server model and optionally additional web service framework information, i.e. character strings, from the headers. To this end, the HTML headers may be evaluated by comparing its contents against a library of character strings associated with different web servers (and web service frameworks) and identifying the appropriate web service hosting implementation by matching a portion of the HTML header content with one of the library character strings. It should be understood that the web service framework information typically contains information about the web service design technology provider, but the web service framework information may further comprise information about the web server architecture, as the web service framework defines the framework of service module implementations to be executed by the web server.

For instance, the following example HTML headers provide identification of the underlying web server architecture:
  Server: Microsoft-IIS/7.5
  Server: Apache-Coyote/1.1
  Server: Apache/2.2.17 (Win32) PHP/5.2.9-2 mod_aspdotnet/2.2
  Server: Apache/2.2.22 (CentOS)
  Server: Microsoft-HTTPAPI/2.0
  Server: TME-GLUE/5.0.2

Server: IBM_HTTP_Server/7.0.0.25 (Unix) DAV/2
Server: Oracle-Application-Server-11g Oracle-Web-Cache-11g/11.1.1.6.0
(G;max-age=300+0; age=0;ecid=50719763606005107,0:1)
Server: Vanguard Server/5.1.4
Server: SQLData Server/3.01
Server: Apache/1.3.41 (Unix) Sun-ONE-ASP/4.0.0 mod_fastcgi/2.2.12 mod_perl/1.30 PHP/4.4.9 FrontPage/5.0.2.2623 mod_ssl/2.8.31 OpenSSL/0.9.7c The following example HTML headers provide identification of the underlying web server architecture as well as web service framework version:

Server: Apache/2.2.17 (Win32) PHP/5.2.9-2 mod_aspdotnet/2.2
X-AspNet-Version: 2.0.50727
Server: Apache
X-Powered-By: ASP.NET 2.0
Server: Microsoft-IIS/7.5
Web-Service: Visual DataFlex 16.1
Server: Microsoft-IIS/6.0
X-Powered-By: ASP.NET
X-AspNet-Version: 4.0.30319

In one or more embodiments, the library of HTML header character strings, such as a list of recognizable web server identifiers and web service framework identifiers, may be the valid character string library of a parser that parses the HTML header to identify the web server hosting the web service and/or the web service framework of the web service.

After extracting the web service and/or the web service framework identification from the HTML headers, the collected web service infrastructure information is subsequently processed in step 250 to infer a web service infrastructure from the collected information. For instance, the method may produce an output in which it is concluded that there are (sufficient) indications that the web service has been designed in NET technology using a West Wind SOAP WSDL Generator 1.50 and is hosted by a Microsoft-IIS/6.0 server in an ASP.NET web service framework. This information may subsequently be used to design and execute a tailored security test for this service, as will be explained in more detail later.

The method may then proceed to step 155 to decide if a confidence score is to be awarded to the inferred web service infrastructure, which confidence score may be calculated in step 160 before the method terminates in step 170 as described in more detail in the detailed description of FIG. 1.

Figure 3:
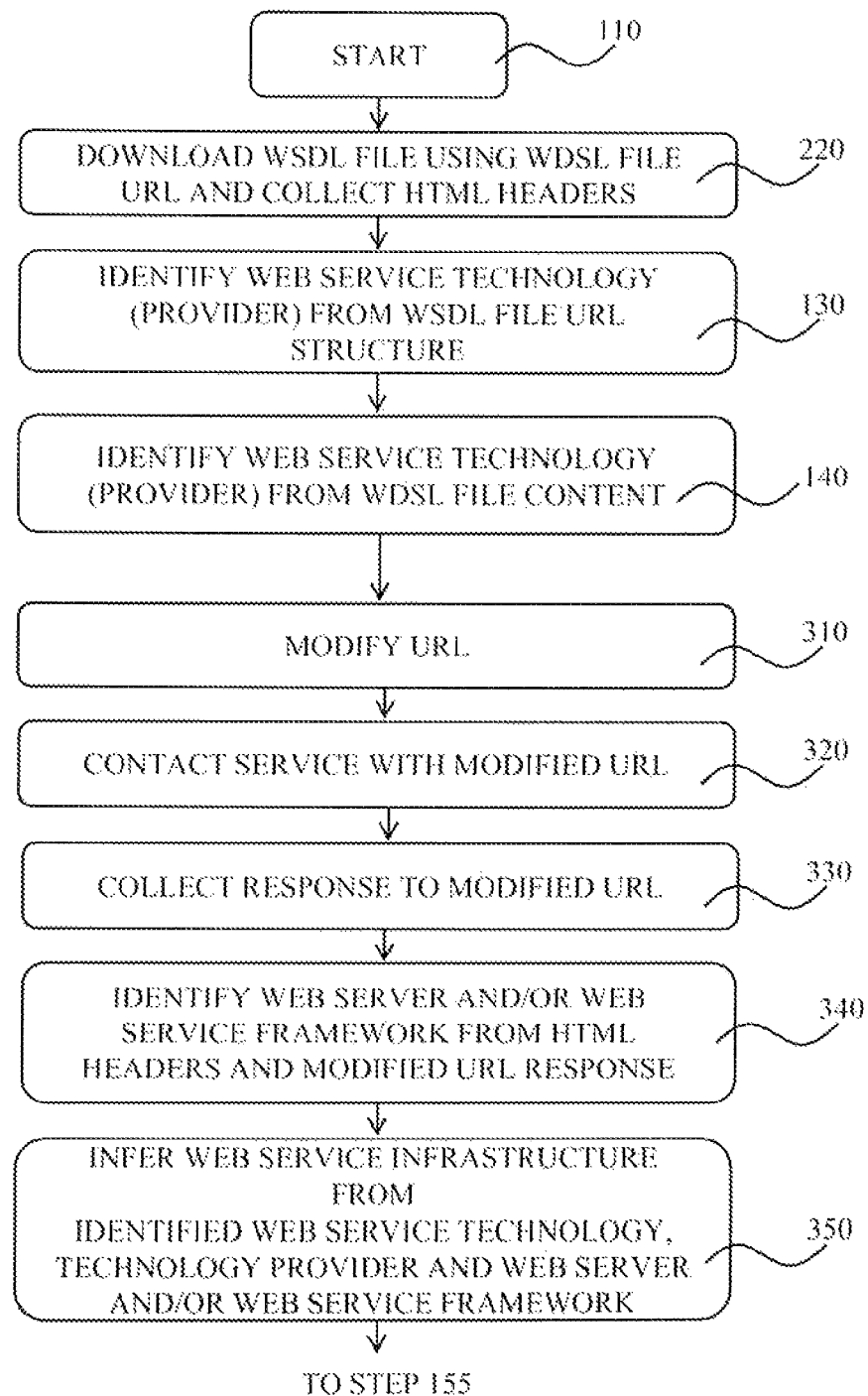
FIG. 3 depicts a flow chart of a further embodiment of a method, in accordance with one or more aspects of the present invention.

In order to further bolster the amount of information retrieved from the web service relevant to the identification or inference of its infrastructure, the hosting platform may be probed in yet another embodiment. This embodiment, which is shown in FIG. 3, is based on the realization that faults can be injected into the web service infrastructure, e.g. into the web server hosting the web service, which faults trigger a response from the web service infrastructure that typically contains web service infrastructure information. Steps in the method 300 in FIG. 3 that are substantially identical to the steps in the method 100 and/or to the steps in the method 200 are identified by the same reference numeral.

As before, the method 300 starts in step 110 before proceeding to step 220 in which the HTML headers communicated during the downloading of the WSDL file and the WSDL file are collected. Next, the web service or WSDL file URL and the WSDL file itself are evaluated in step 130 and 140 respectively as previously explained.

The method 300 subsequently proceeds to step 310 in which the URL used to retrieve the WSDL file is modified. Such modification may be achieved by truncating the URL or inserting an error into the URL by replacing one or more characters in the URL with different characters. The modified URL is subsequently used in step 320 to access the web service infrastructure, e.g. contact the web server hosting the web service, to inject a fault into this infrastructure. For instance, in case of a truncated URL, the user may not have access privileges to a root directory identified by the truncated URL, which will trigger an access denial message from the web service infrastructure. Similarly, in case of an URL containing an inserted typographical error, the web service infrastructure will return an address not found error message or the like. Such triggered responses will typically contain a character string indicative of the web server model and/or web service framework associated with the web service under investigation.

An example response that can be triggered by such fault injection is given below:
System.Data.OleDb.OleDbException: Syntax error in number in query expression 'accountid=xxx'
   at
System.Data.OleDb.OleDbCommand.ExecuteCommand-TextErrorHandling(OleDbHRes ult hr)
   at
System.Data.OleDb.OleDbCommand.ExecuteCommand-TextForSingleResult(tagDBPAR AMS dbParams, Object& executeResult)
   at System.Data.OleDb.OleDbCommand.ExecuteCommandText(Object& executeResult)
   at System.Data.OleDb.OleDbCommand.ExecuteCommand(CommandBehavior behavior, Object& executeResult)
   at System.Data.OleDb.OleDbCommand.ExecuteReaderInternal(CommandBehavior behavior, String method)
   at System.Data.OleDb.OleDbCommand.ExecuteScalar( )
   at Altoro.Services.TransferBalance(MoneyTransfer transDetails) in d:\downloads\AltoroMutual_v6\website\App_Code\ WebService.cs:line 146 This response provides a clear insight in the web service framework or web service stack of the web service under investigation and as such can be interpreted by character string recognition to extract this information from the response.

In step 330, the response to the injected fault is received and collected from the web service infrastructure, after which the collected response is evaluated in step 340, e.g. by parsing the collected response for the presence of predefined character strings as previously explained. The HTML headers collected in step 220 may also be evaluated in this step, although it is of course equally feasible to evaluate the HTML headers in a separate step.

The method subsequently proceeds to step 350 in which the collected web service infrastructure information is processed essentially in the same manner as in step 250 to infer a web service infrastructure from the collected information. The method may then proceed to step 155 to decide if a confidence score is to be awarded to the inferred web service infrastructure, which confidence score may be calculated in step 160 before the method terminates in step 170 as described in more detail in the detailed description of FIG. 1.

At this point it is noted that although the steps of the methods 100, 200 and 300 are described in a particular order, it should be understood that this order has been suggested by way of non-limiting example only, and that it will be immediately apparent to the skilled person that at least some of these steps may be interchanged, combined or executed in parallel without departing from the teachings of the present invention.

It is further noted that it will be clear that at least some embodiments are concerned with the generation of different types or groups of information, each type or group being indicative of the infrastructure of the investigated web service. Examples of such types or groups of information include web service technology, web service technology provider, web service design tooling, web service framework and web server hosting the web service although it should be understood that this is not an exhaustive list and that other types or groups of information, e.g. web server operating system, may be added to this list to form a more detailed picture of the web service infrastructure in place.

Figure 4:
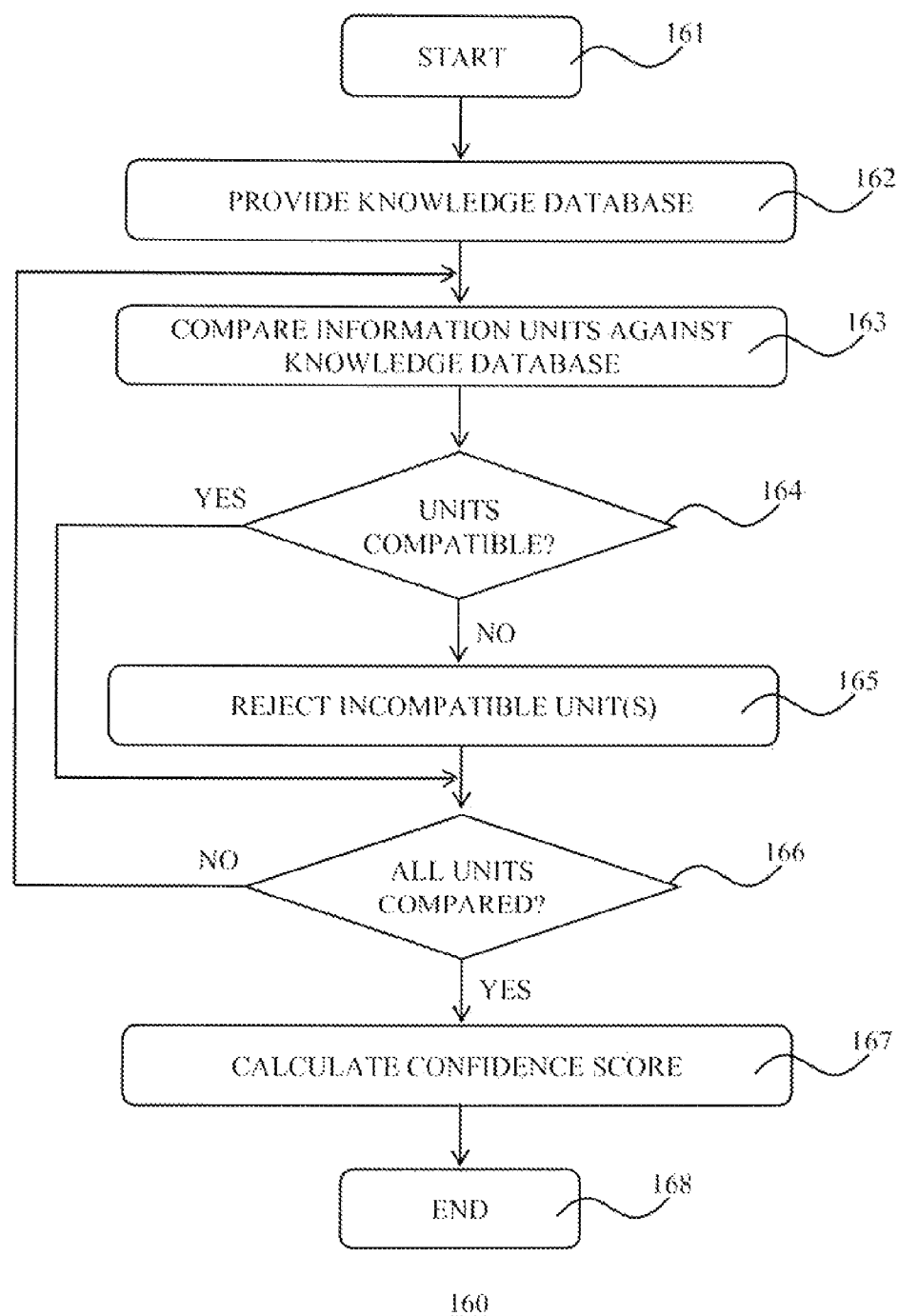
FIG. 4 depicts a flow chart of an aspect of a method, according to one embodiment of the present invention.

FIGS. 1-3 all include the optional step of assigning a confidence score to the inferred web service infrastructure. FIG. 4 depicts a flow chart of an example embodiment of a method to calculate such a confidence score.

The method 160 starts in step 161 after which the method proceeds to step 162 in which a knowledge database is provided. The knowledge database typically defines a set of rules that define existing relationships between different types of web service infrastructure information, such as compatibility of existing web servers with existing web service frameworks. For example, it is known that a Microsoft IIS server does not support Java web service stacks, a Tomcat server does not support asp.net web service stacks, and so on. These known (in)compatibilities can be used to build the rules of the knowledge database provided in step 162.

In step 163, the identified web service infrastructure information as derived from the identified character strings is compared against this database. In particular, within the same group of web service infrastructure information, e.g. web server information, or between different groups of web service infrastructure information, e.g. web server information and web service framework information, combinations of individual pieces of information are verified using these rules as indicated in step 164 to detect inconsistencies in the obtained set of service infrastructure information.

In case of incompatibilities in this data set, the method may proceed to step 165 to reject individual pieces of information that appear incompatible with the overall trends in the retrieved information. For instance, in case of multiple pieces of information inferring the web service being hosted by a Microsoft IIS server and a single piece of information inferring that the web service framework is a Java web service stack, the inferred web service framework information may be rejected as most likely to be incorrect. Steps 163-165 may be repeated until all pieces of information, i.e. all information units are processed in this manner, as checked in step 166.

The method subsequently proceeds to step 167 in which the confidence score is calculated based on the total number of accepted units of web service infrastructure information. For instance, the confidence score may be linearly correlated to this number. The manner of calculation of the confidence score is not particularly critical and may be achieved in any suitable manner using any suitable algorithm or formula.

In an embodiment, the confidence score may be based on a combination of the total number of accepted units of web service infrastructure information and the number of rejected units of web service infrastructure information. A high number of rejected units of web service infrastructure information may be indicative of a low confidence in the inferred web service architecture, which may be reflected in awarding a low confidence score to this inference. For instance, the confidence score may be linearly correlated to A/R in which A is the number of accepted units of web service infrastructure information and R is the number of rejected units of web service infrastructure information.

Upon calculation of the confidence score the method terminates in step 168.

The inferred web service architecture, e.g. the inferred web service technology, the inferred web service technology provider, the inferred design tool used to design the web service, the inferred web server and/or the inferred web service stack give a detailed insight in the structure of the web service. This detailed insight may be used to design a more sophisticated security test for the web service because the web service does not need to be treated as a black box, contrary to existing test methodologies. For instance, a test designer may design a test module library with different test modules tailored to different web service infrastructures, which library may be accessed using the inferred web service infrastructure to select the appropriate test modules. The thus compiled security test may be used to emulate an attack on the web service in order to test its security, as is well known per se in the art.

The various steps of the methods according to one or more embodiments may be defined in terms of computer program code, which code may be stored on a computer-readable medium. For example, the computer-readable storage medium may be selected from a CD, DVD, flash memory card, a USB memory stick, a random access memory, a read-only memory, a computer hard disk, a storage area network, a network server and an Internet server.

The various steps of the methods according to one or more embodiments may be implemented by one or more processors of a computer system by retrieving the computer program code from the computer-readable medium and executing the computer program code in the one or more processors in order to create a system for erring a web service infrastructure from a web service hosted on a web server and/or for testing a web service hosted on a web server.

Figure 5:
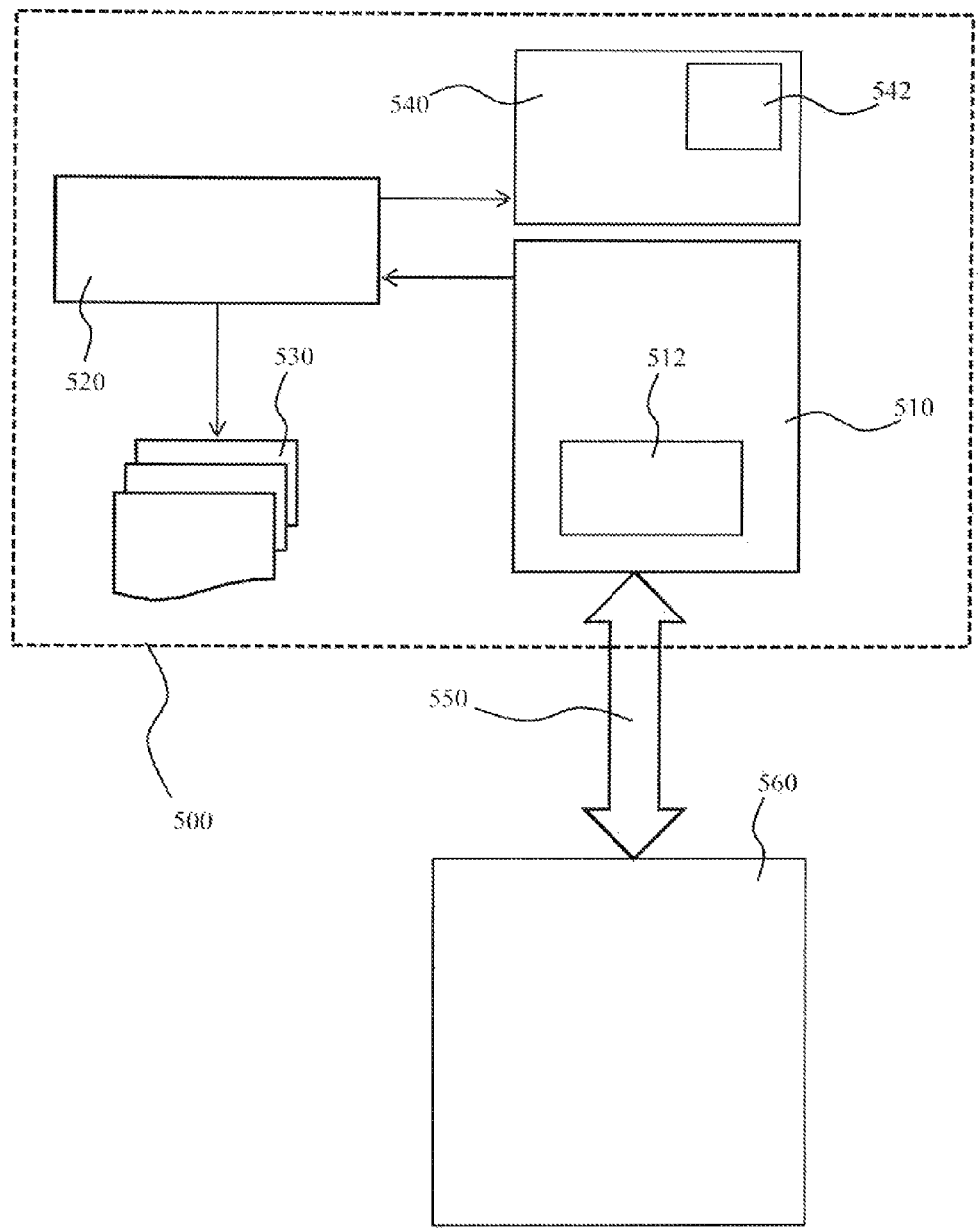
FIG. 5 schematically depicts a system according to one or more aspects of the present invention.

FIG. 5 schematically depicts an embodiment of such a system 500 in functional terms. The system 500 comprises a communication module 510 for communicating with a web service 560 over the Internet 550. The communication module 510 is typically adapted to contact the web service 560 over the Internet 550 to download the web service description language (WSDL) file describing the web service from a location identified by a uniform resource locator (URL) on the web server hosting the web service 560.

In an embodiment, the communication module 510 may further be adapted to collect the HTML headers that are generated during the communications between the communication module 510 and the web service 560 during the download of the WSDL file.

In an embodiment, the communication module 510 may further comprise a probing module 512 for injecting faults into the infrastructure of the web service 560 in order to trigger a response from the web service stack and/or the web server hosting the web service. The probing module 512 may for instance be adapted to modify the URL used to retrieve the WSDL file by truncating the URL or replacing one or more characters of the URL with different characters to trigger this response. The communication module 510 may be adapted to collect this response.

The system 500 further comprises an inference module 520 that receives the information harvested by the communication module 510, e.g. the WSDL file, WSDL file URL, the HTML headers and/or the probe responses. The inference module 520 is adapted to recognize character strings in the information received from the communication module 510 that are indicative of an aspect of the web service infrastructure and infer the web service infrastructure from these identified aspects as explained in more detail above. The inference module 520 may have access to one or more libraries 530 in which predefined character strings are stored and associated with known aspects of the web service infrastructure. In an embodiment, the inference module 520 comprises one or more parsers and the one or more libraries 530 comprise parser libraries.

The system 500 may further comprise a confidence scoring module 540 including a knowledge database 542. The inference module 530 may be adapted to forward the potential aspects of the web service infrastructure inferred by the identified character strings to the confidence scoring module 540 for evaluation as per the method 160 shown in FIG. 4. This yields an inferred infrastructure of the web service 560 with a confidence score as previously explained.

Although not shown in FIG. 5, the system 500 may further comprise one or more peripheral input devices, e.g. a keyboard, mouse, trackball, microphone coupled to a voice recognition module, a touch screen and so on, to provide the system 500 with an input, e.g. the URL of the web service 560. The system 500 may further comprise one or more peripheral output devices, e.g. a monitor, a printer, a loud speaker and so on, for instance to provide a user of the system 500 with the inferred infrastructure of the web service 560 and its associated confidence score if calculated.

It should be understood that the various modules of the system 500, e.g. the communication module 510, the inference module 520 and the confidence scoring module 540 may be realized by computer program code executed on a processor architecture (not shown) of the system 500, which processor architecture may comprise one or more processors and data storage such as a memory, hard disk, NAS, SAN, network server and so on comprising the computer program code, which data storage may further provide (temporary) storage for the data retrieved or generated by the communication module 510, the one or more libraries 530 and the knowledge database 542.

Alternatively, the computer system may have one or more dedicated hardware modules for executing at least some steps of the method according to one or more embodiments. In other words, a method according to an embodiment may be present on the computer system entirely as software, in the form of a software/hardware co-design or entirely in hardware.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A computer-implemented method of inferring a web service infrastructure from a web service hosted on a web server, the method comprising:
   downloading a web service description language (WSDL) file describing the web service from a location on the web server identified by a uniform resource locator (URL);
   identifying at least one of a web service design technology and a web service technology provider from character strings indicative of the web service design technology and web service technology provider, respectively, in at least one of the WSDL file and URL;
   inferring the web service infrastructure from the identified web service design technology and the identified web service technology provider;
   assigning a confidence score to the inferred web service infrastructure wherein the assigning the confidence score comprises:
      evaluating individual pieces of web service infrastructure information;
      accepting or rejecting each individual piece of web service infrastructure information; and
      calculating the confidence score from the accepted pieces of web service infrastructure information;
   wherein:
      the evaluating the individual pieces of web service infrastructure information comprises identifying incompatible pieces of web service infrastructure information; and
      the accepting or rejecting each individual piece of web service infrastructure information comprises rejecting the incompatible pieces of web service infrastructure information.

2. A system for inferring a web service infrastructure from a web service hosted on a web server, the system comprising:
   a memory; and
   a processor communicatively coupled to the memory, wherein the system performs a method comprising:
      downloading a web service description language (WSDL) file describing the web service from a location on the web server identified by a uniform resource locator (URL);
      identifying at least one of a web service design technology and a web service technology provider from character strings indicative of the web service design technology and web service technology provider, respectively, in at least one of the WSDL file and URL;
      inferring the web service infrastructure from the identified web service design technology and the identified web service technology provider;
      assigning a confidence score to the inferred web service infrastructure wherein the assigning the confidence score comprises:
         evaluating individual pieces of web service infrastructure information;
         accepting or rejecting each individual piece of web service infrastructure information; and
         calculating the confidence score from the accepted pieces of web service infrastructure information;
      wherein:
         the evaluating the individual pieces of web service infrastructure information comprises identifying incompatible pieces of web service infrastructure information; and
         the accepting or rejecting each individual piece of web service infrastructure information comprises rejecting the incompatible pieces of web service infrastructure information.

3. A computer program product for inferring a web service infrastructure from a web service hosted on a web server, the computer program product comprising:

a non-transitory computer readable storage medium having program instructions embodied therewith, the program instructions being executable by a processor to cause the processor to perform a method comprising:

downloading a web service description language (WSDL) file describing the web service from a location on the web server identified by a uniform resource locator (URL);

identifying at least one of a web service design technology and a web service technology provider from character strings indicative of the web service design technology and web service technology provider, respectively, in at least one of the WSDL file and URL;

inferring the web service infrastructure from the identified web service design technology and the identified web service technology provider;

assigning a confidence score to the inferred web service infrastructure wherein the assigning the confidence score comprises:
evaluating individual pieces of web service infrastructure information;
accepting or rejecting each individual piece of web service infrastructure information; and
calculating the confidence score from the accepted pieces of web service infrastructure information;
wherein:
the evaluating the individual pieces of web service infrastructure information comprises identifying incompatible pieces of web service infrastructure information; and
the accepting or rejecting each individual piece of web service infrastructure information comprises rejecting the incompatible pieces of web service infrastructure information.

* * * * *